(12) United States Patent
Ding

(10) Patent No.: US 9,307,435 B2
(45) Date of Patent: Apr. 5, 2016

(54) METHOD AND DEVICE FOR REPORTING CELL STATUS

(71) Applicant: Huawei Technologies Co., Ltd., Shenzhen, Guangdong (CN)

(72) Inventor: Yanghua Ding, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 14/281,527

(22) Filed: May 19, 2014

(65) Prior Publication Data

US 2014/0256308 A1 Sep. 11, 2014

Related U.S. Application Data

(63) Continuation of application No. PCT/CN2011/082594, filed on Nov. 22, 2011.

(51) Int. Cl.
*H04W 4/00* (2009.01)
*H04W 24/10* (2009.01)

(52) U.S. Cl.
CPC .................. *H04W 24/10* (2013.01)

(58) Field of Classification Search
CPC ...... H04W 24/10; H04W 24/08; H04W 24/02
USPC ............... 455/422.1, 438, 446, 453; 370/241
See application file for complete search history.

(56) References Cited

U.S. PATENT DOCUMENTS

| | | | | |
|---|---|---|---|---|
| 5,966,546 A | * | 10/1999 | Thomas et al. | 710/48 |
| 2003/0189909 A1 | * | 10/2003 | Chao | H04L 1/1854 370/331 |
| 2004/0208160 A1 | * | 10/2004 | Petrovic et al. | 370/350 |
| 2005/0073989 A1 | * | 4/2005 | Wang | H04L 1/0002 370/349 |
| 2006/0013257 A1 | * | 1/2006 | Vayanos | 370/473 |
| 2006/0154680 A1 | | 7/2006 | Kroth et al. | |
| 2008/0045219 A1 | | 2/2008 | Terry | |
| 2009/0119564 A1 | * | 5/2009 | Sagfors | H04L 1/1854 714/748 |
| 2010/0034095 A1 | * | 2/2010 | Ho | H04L 1/1642 370/241 |
| 2010/0135229 A1 | * | 6/2010 | Lohr | H04W 72/1284 370/329 |
| 2010/0216471 A1 | * | 8/2010 | Meyer | H04W 36/26 455/436 |

FOREIGN PATENT DOCUMENTS

| | | |
|---|---|---|
| CN | 1709006 A | 12/2005 |
| CN | 1809199 A | 7/2006 |
| CN | 101511120 A | 8/2009 |
| CN | 101610536 A | 12/2009 |
| CN | 101651589 A | 2/2010 |
| CN | 101959252 A | 1/2011 |

\* cited by examiner

*Primary Examiner* — Mong-Thuy Tran
(74) *Attorney, Agent, or Firm* — Leydig, Voit & Mayer, Ltd.

(57) ABSTRACT

Determining a distribution delay of a bearer by using a preset delay distribution algorithm according to a preset time period for reporting a cell status; starting a periodic timer of the bearer after the distribution delay elapses, where the periodic timer uses the time period as a period; determining, according to the periodic timer, whether the cell status needs to be reported; and carrying information of the cell status in an uplink data packet of the bearer if the cell status needs to be reported. Thereby avoiding greatly centralized reporting of the cell status and centralized policy adjustment that is performed for the bearers, so that great jitter of service traffic borne on a cell is controlled effectively.

14 Claims, 3 Drawing Sheets

METHOD AND DEVICE FOR REPORTING CELL STATUS

CROSS-REFERENCE TO RELATED APPLICATIONS

This application is a continuation of International Patent Application No. PCT/CN2011/082594, filed on Nov. 22, 2011, which is hereby incorporated by reference in its entirety.

FIELD OF THE INVENTION

The embodiments of the present invention relate to the field of wireless communications, and in particular, to a method and a device for reporting a cell status.

BACKGROUND OF THE INVENTION

With the rapid development of smart mobile terminals and the mobile Internet, an application that user data accesses a packet data network through a wireless base station is very common. Due to a limitation of an access bandwidth of the wireless base station, when a large number of users access through the same wireless cell, a shortage of a cell resource is caused, thereby affecting service experience of a user and hindering telecommunication service development.

Grooming data traffic of a user, reducing a traffic load of a cell during busy hours, ensuring user experience of a high-value service, and making full use of a wireless bandwidth resource become a focus and a hot issue for discussion in the industry.

An important development trend is to trigger policy control for different levels of users and different types of services in a cell in a busy status of the cell by detecting the usage of a resource in a wireless cell. At present, multiple solutions are available for detecting a busy/idle status of a wireless cell. A typical solution for detecting a busy/idle status of a wireless cell includes: A radio access network detects a cell status; a core network device detects delay variation of a wireless cell or a user message; and a deployed probe device independently detects a status of a wireless cell.

A bearer is a basic unit for controlling capacity, a delay, and a bit rate of a user service on a radio access network (RAN, Radio Access Network) side. One user can use multiple bearers to carry out different services. When a status of a wireless cell changes from "idle" to "busy", quality degradation of some in-time services of the user may be caused due to an insufficient radio resource. In this case, a bandwidth, delay, and capacity of a certain type of services of some users need to be adjusted to relieve a resource shortage of the wireless cell.

A procedure of performing policy control according to a cell status is basically as follows:

When a status of a wireless cell changes, cell status information is reported to a packet gateway through a user bearer data message; and the packet gateway performs comparison for the cell status information recorded in the user bearer. For a user bearer indicating that the status of the wireless cell has changed, the packet gateway instructs a policy and charging rules function (Policy and Charging Rules Function, referred to as PCRF) to make a control policy decision.

If a cell status is reported on bearers in a centralized manner, however, data traffic borne on the cell may fiercely jitter due to policy control performed by the PCRF for these bearers.

SUMMARY OF THE INVENTION

The embodiments of the present invention provide a method for reporting a cell status, aiming to avoid that a cell status is reported on bearers in a centralized manner, and avoid that for the cell status that is reported in a centralized manner, a PCRF performs policy control on these bearers, which causes that data traffic borne on a cell jitters fiercely.

In one aspect, a method for reporting a cell status is provided. The method includes:

determining a distribution delay of a bearer by using a preset delay distribution algorithm according to a preset time period for reporting a cell status;

starting a periodic timer of the bearer after the distribution delay elapses, where the periodic timer uses the time period as a period;

determining, according to the periodic timer, whether the cell status needs to be reported; and carrying information of the cell status in an uplink data packet of the bearer if the cell status needs to be reported.

In another aspect, a radio access network device is further provided. The device includes:

a configuration unit, configured to determine a distribution delay of a bearer by using a preset delay distribution algorithm according to a preset time period for reporting a cell status, and configured to start a periodic timer of the bearer after the distribution delay elapses, where the periodic timer uses the time period as a period;

a determining unit, configured to determine, according to the periodic timer, whether the cell status needs to be reported; and a sending unit, configured to carry information of the cell status in an uplink data packet of the bearer if the cell status needs to be reported.

According to the embodiments of the present invention, distribution of bearers on which a cell status is reported within a preset time period can be controlled, thereby avoiding greatly centralized reporting of the cell status and centralized policy adjustment that is performed for the bearers, so that great jitter of service traffic borne on a cell is controlled effectively.

BRIEF DESCRIPTION OF THE DRAWINGS

To illustrate the technical solutions in the embodiments of the present invention more clearly, the accompanying drawings required for describing the embodiments or the prior art are described briefly in the following. Apparently, the accompanying drawings in the following description merely show some embodiments of the present invention, and persons of ordinary skill in the art may still derive other drawings from these accompanying drawings without creative efforts.

DETAILED DESCRIPTION OF THE EMBODIMENTS

The technical solutions in the embodiments of the present invention are clearly and completely described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

The technical solutions in the embodiments of the present invention may be applied to various kinds of communication systems, such as a global system for mobile communication (Global System For Mobile Communication, GSM), a code division multiple access (CDMA, Code Division Multiple Access) system, wideband code division multiple access (WCDMA, Wideband Code Division Multiple Access Wireless), general packet radio service (GPRS, General Packet Radio Service), and long-term evolution (LTE, Long Term Evolution).

A user equipment (UE, User Equipment) may communicate with one or multiple core networks through a radio access network (such as RAN, Radio Access Network). The user equipment may be a mobile terminal, such as a mobile phone (or called a cellular phone) or a computer that has a mobile terminal, for example, may be a portable, pocket-sized, handheld, computer-embedded, or vehicle-mounted mobile apparatus, which exchanges signaling and/or data with the radio access network.

A base station may be a base transceiver station (BTS, Base Transceiver Station) in GSM or CDMA, may also be a Node B in WCDMA, and may also be an evolutional Node B (eNB or e-NodeB, evolutional Node B) in LTE, which is not limited in the embodiments of the present invention. To facilitate the description, the following embodiments are described by taking a Node B as an example.

According to the embodiments of the present invention, cell status reporting is processed in a unit of bearers, which are evenly distributed as much as possible within one time period for reporting a cell status. Alternatively, a time period is divided into multiple time segments, and a part of bearers are processed in each time segment.

Figure 1:
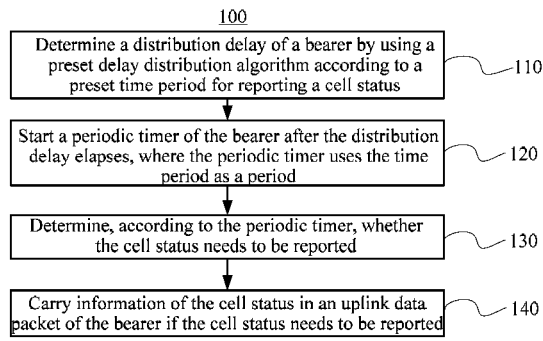
FIG. 1 is a flow chart of a method for reporting a cell status according to an embodiment of the present invention.

FIG. 1 is a flow chart of a method for reporting a cell status according to an embodiment of the present invention. As shown in FIG. 1, a method 100 for reporting a cell status includes:

110: Determine a distribution delay of a bearer by using a preset delay distribution algorithm according to a preset time period for reporting a cell status.

120: Start a periodic timer of the bearer after the distribution delay elapses, where the periodic timer uses the time period as a period.

130: Determine, according to the periodic timer, whether the cell status needs to be reported.

140: Carry information of the cell status in an uplink data packet of the bearer if the cell status needs to be reported.

It is assumed that a time period for detecting a busy/idle status of a wireless cell is T1, and the length of a time period for reporting a cell status is T2, and it is required that T2>=T1. That is, a time period for reporting a cell status is longer than or equal to a time period for detecting a cell status. In this way, when a cell status changes, and a bearer reports the cell status and policy control is triggered, it is possible to reduce, according to a cell status change, the number of bearers of a cell that needs to be controlled, thereby reducing user services that are affected by the policy control. In this way, it is ensured that cell traffic decrease is minimized, so that revenues of an operator are protected, a service quality requirement of a service is also satisfied, thereby improving service experience of a user.

According to this embodiment of the present invention, the preset delay distribution algorithm may adopt a random algorithm, so that after different bearers are created, start time points of startup of the periodic timer are almost randomly distributed within the time period for reporting a cell status. With such design, the number of controlled bearers can almost be evenly distributed within the time period for reporting a cell status, thereby avoiding great jitter of cell traffic due to centralized control performed by a PCRF on a larger number of bearers simultaneously.

According to this embodiment of the present invention, the preset delay distribution algorithm may also adopt a non-random algorithm, such as a hash algorithm or an equal-step algorithm. With such design, when a cell bearer is created, a time point for reporting a cell status within the time period for reporting a cell status is determined. Distribution of cell bearers within the whole time period for reporting a cell status may be determined by adjusting an algorithm, so that the distribution of bearers for reporting a cell status is intervened selectively. Persons skilled in the art may also select another appropriate delay distribution algorithm according to a concept of this embodiment of the present invention, so as to determine distribution of cell bears within the time period for reporting a cell status. It shall be considered that all technical solutions obtained according to this understanding fall within the scope of the embodiments of the present invention.

Figure 2:
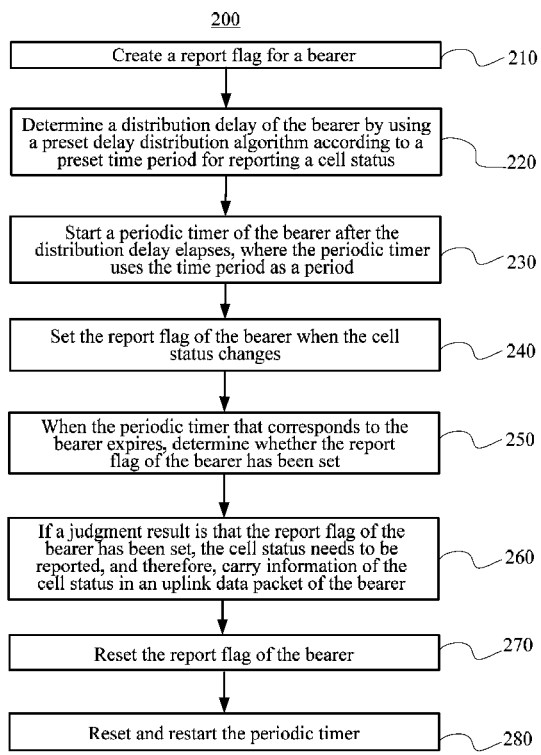
FIG. 2 is a flow chart of a method for reporting a cell status according to an embodiment of the present invention.

Further, in a method embodiment 200 of the present invention shown in FIG. 2, a report flag may be created for a bearer, so that a cell status is reported according to a periodic timer of the bearer in further combination with the report flag of the bearer. The method 200 includes:

210: Create a report flag for a bearer.

Specifically, the creating a report flag for a bearer may include:

creating a report flag for the bearer while the bearer is created; or creating a report flag for the bearer at any moment after the bearer is created.

220: Determine a distribution delay of the bearer by using a preset delay distribution algorithm according to a preset time period for reporting a cell status.

Specifically, according to this embodiment of the present invention, the determining a distribution delay of the bearer may include:

determining the distribution delay of the bearer while the bearer is created; or determining the distribution delay of the bearer at any moment after the bearer is created.

230: Start a periodic timer of the bearer after the distribution delay elapses, where the periodic timer uses the time period as a period.

240: Set the report flag of the bearer when the cell status changes.

250: When the periodic timer that corresponds to the bearer expires, determine whether the report flag of the bearer has been set.

260: If a determination result is that the report flag of the bearer has been set, the cell status needs to be reported, and therefore, carry information of the cell status in an uplink data packet of the bearer.

270: Reset the report flag of the bearer.

280: Reset and restart the periodic timer.

According to the embodiment shown in FIG. 2, a cell status is reported on a bearer only when a cell status changes within a time period for reporting a cell status. In a subsequent time period for reporting a cell status, a bearer data packet does not carry a cell status if the cell status does not change. With such design, for each time period for reporting a cell status, data that carries a cell status is greatly reduced, and a load that a core network device processes a data packet that carries a cell status is alleviated, thereby further reducing the number of bearers that are subject to policy control of a PCRF, so that cell traffic changes more smoothly.

According to this embodiment of the present invention, after the distribution delay elapses, an uplink data packet of the bearer may also carry information of the cell status and a periodic timer may be started.

According to this embodiment of the present invention, when the periodic timer expires, it may be considered that the cell status needs to be reported, without determining the report flag. Therefore, an uplink data packet of the bearer carries information of the cell status when the periodic timer expires.

Figure 3:
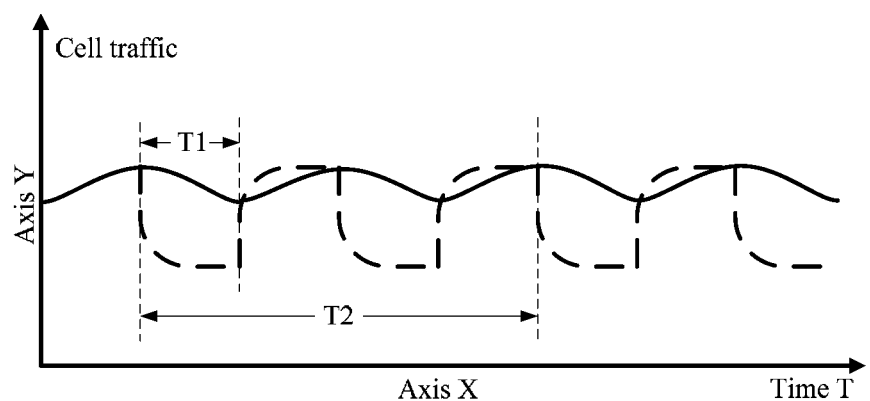
FIG. 3 is a schematic diagram of an effect of a method for reporting a cell status according to an embodiment of the present invention.

FIG. 3 is a diagram of comparing cell traffic in the case that a random algorithm is adopted to determine a distribution delay of a bearer with cell traffic in the case that cell status reporting is triggered in a centralized manner conventionally. As shown in FIG. 3, a full line represents a cell traffic change in the case that a method for reporting a cell status according to this embodiment of the present invention is adopted, whereas a dotted line represents a cell traffic change in the case that a conventional method for reporting a cell status is adopted. It can be seen from FIG. 3 that, by adopting the method for reporting a cell status according to this embodiment of the present invention, cell traffic jitter may be greatly relieved.

Figure 4:
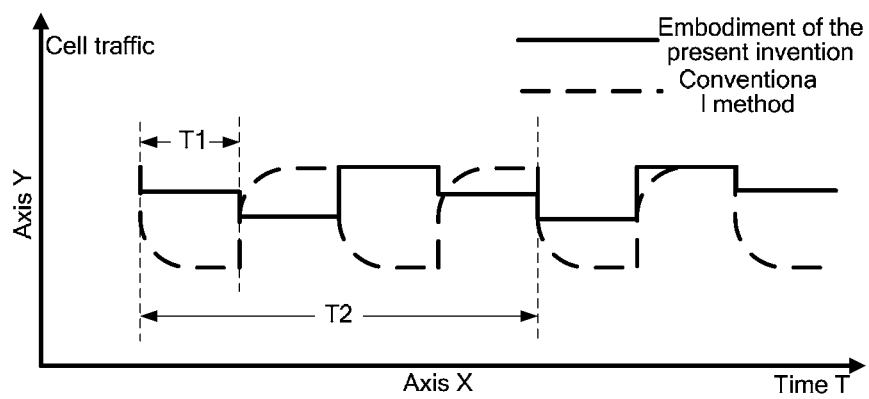
FIG. 4 is a schematic diagram of an effect of a method for reporting a cell status according to an embodiment of the present invention.

FIG. 4 is a diagram of comparing cell traffic in the case that a non-random algorithm is adopted to determine a distribution delay of a bearer with cell traffic in the case that cell status reporting is triggered in a centralized manner conventionally. As shown in FIG. 4, a full line represents a cell traffic change in the case that a method for reporting a cell status according to this embodiment of the present invention is adopted, whereas a dotted line represents a cell traffic change in the case that a conventional method for reporting a cell status is adopted. It can be seen from FIG. 4 that, by adopting the method for reporting a cell status according to this embodiment of the present invention, cell traffic jitter may be greatly relieved.

According to this embodiment of the present invention, distribution of bearers on which a cell status is reported within a preset time period can be controlled, thereby avoiding greatly centralized reporting of the cell status and centralized policy adjustment that is performed for the bearers, so that great jitter of service traffic borne on a cell is controlled effectively.

According to an embodiment of the present invention, a radio access network device for reporting a cell status is further provided. This device may be configured to implement a method in the method embodiment of the present invention.

Figure 5:
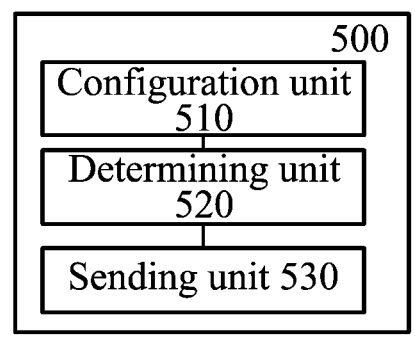
FIG. 5 is a schematic structural diagram of a radio access network device according to an embodiment of the present invention.

FIG. 5 is a schematic structural diagram of a radio access network device 500 according to an embodiment of the present invention. As shown in FIG. 5, the device 500 includes:

a configuration unit 510, configured to determine a distribution delay of a bearer by using a preset delay distribution algorithm according to a preset time period for reporting a cell status, and configured to start a periodic timer of the bearer after the distribution delay elapses, where the periodic timer uses the time period as a period;

a determining unit 520, configured to determine, according to the periodic timer, whether the cell status needs to be reported; and a sending unit 530, configured to carry information of the cell status in an uplink data packet of the bearer if the cell status needs to be reported.

All features described in the method embodiment part of the present invention are applicable to the device embodiment of the present invention in an appropriate case, and vice versa.

According to this embodiment of the present invention, the configuration unit 510 is further configured to create a report flag for the bearer, and set the report flag when the cell status changes.

The determining unit 520 is specifically configured to, when the periodic timer expires, determine whether the report flag has been set, where the cell status needs to be reported if the report flag has been set.

According to this embodiment of the present invention, the configuration unit 510 is specifically configured to create a report flag for the bearer while the bearer is created, or configured to create a report flag for the bearer at any moment after the bearer is created.

According to this embodiment of the present invention, the determining unit 520 is specifically configured to determine whether the periodic timer expires, where the cell status needs to be reported if the periodic timer expires.

According to this embodiment of the present invention, the configuration unit 510 is specifically configured to determine the distribution delay of a bearer while the bearer is created, or configured to determine the distribution delay of a bearer at any moment after the bearer is created.

According to this embodiment of the present invention, the sending unit 530 is specifically configured to carry information of the cell status in an uplink data packet of the bearer after the distribution delay elapses.

According to this embodiment of the present invention, if the report flag has been set after the distribution delay elapses, the sending unit 530 is configured to carry information of the cell status in an uplink data packet of the bearer, and the configuration unit 510 is configured to reset the report flag.

According to this embodiment of the present invention, the configuration unit 510 is specifically configured to determine the distribution delay of the bearer by using a random algorithm, a hash algorithm, or an equal-step algorithm.

Persons of ordinary skill in the art may be aware that, in combination with the examples described in the embodiments disclosed in this specification, units and algorithm steps can be implemented by electronic hardware, or a combination of computer software and electronic hardware. Whether the functions are executed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network elements. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as a separate product, the functions may be stored in a computer-readable storage medium. Based on such an understanding, the technical solutions of the present invention essentially, or the part contributing to the prior art, or part of the technical solutions may be implemented in the form of a software product. The computer software product is stored in a storage medium and includes several instructions for instructing a computer device (which may be a personal computer, a server, or a network device, and the like) to execute all or a part of steps of the methods described in the embodiments of the present invention. The storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the appended claims.

What is claimed is:

1. A method for reporting a cell status, comprising:
   determining, by a radio network access device, a starting delay of a periodic timer of a bearer through using a preset delay distribution algorithm according to a preset time period for reporting the cell status;
   starting, by the radio network access device, the periodic timer of the bearer after the starting delay elapses, wherein the periodic timer uses the preset time period as a period;
   determining, by the radio network access device, according to the periodic timer, whether the cell status needs to be reported, wherein the determining whether the cell status needs to be reported comprises: determining, when the periodic timer expires, whether the cell status has changed before the periodic timer expires, wherein if the cell status has changed, determining that the cell status needs to be reported;
   when it is determined that the cell status needs to be reported, sending, by the radio network access device, an uplink data packet of the bearer which carries information of the cell status; and
   setting, by the radio network access device, a report flag for the bearer, when the cell status changes,
   wherein the determining whether the cell status has changed before the periodic timer expires further comprises determining whether the report flag has been set before the periodic timer expires.

2. The method according to claim 1, wherein further comprising:
   after sending the uplink data packet of the bearer, resetting, by the radio network access device, the report flag.

3. The method according to claim 1, wherein the determining, according to the periodic timer, whether the cell status needs to be reported comprises:
   determining whether the periodic timer expires, wherein the cell status needs to be reported if the periodic timer expires.

4. The method according to claim 1, wherein the preset time period for reporting the cell status is longer than or equal to a time period for detecting the cell status.

5. The method according to claim 1, further comprising:
   when starting the periodic timer of the bearer, sending, by the radio network access device, the uplink data packet of the bearer which carries the information of the cell status.

6. The method according to claim 1, further comprising:
   when starting the periodic timer of the bearer, determining, by the radio network access device, whether the report flag is set; and
   when it is determined that the report flag has been set, sending, by the radio network access device, the uplink data packet of the bearer which carries the information of the cell status and resetting the report flag.

7. The method according to claim 1, wherein:
   the determining the starting delay of the periodic timer of the bearer by using the preset delay distribution algorithm comprises:
   determining the starting delay of the periodic timer of the bearer using one of the following algorithms: a random algorithm, a hash algorithm, and an equal-step algorithm.

8. A radio access network device, comprising:
   a processor, configured to:
      determine a starting delay of a periodic timer of a bearer through using a preset delay distribution algorithm, according to a preset time period for reporting a cell status,
      start the periodic timer of the bearer after the starting delay elapses, wherein the periodic timer uses the preset time period as a period, and
      determine, according to the periodic timer, whether the cell status needs to be reported, wherein determining whether the cell status needs to be reported comprises: determining, when the periodic timer expires, whether the cell status has changed before the periodic timer expires, wherein if the cell status has changed, determine that the cell status needs to be reported; and
   a sender, configured to send an uplink data packet of the bearer which carries information of the cell status when it is determined that the cell status needs to be reported, wherein the processor is further configured to:
set a report flag for the bearer, when the cell status changes, and
determine whether the report flag has been set before the periodic timer expires.

9. The device according to claim 8, wherein the processor is further configured to:
reset, after the sender sends the uplink data packet of the bearer, the report flag.

10. The device according to claim 8, wherein the processor is configured to:
determine whether the periodic timer expires, wherein the cell status needs to be reported if the periodic timer expires.

11. The device according to claim 8, wherein:
the preset time period for reporting the cell status is longer than or equal to a time period for detecting the cell status.

12. The device according to claim 8, wherein the sender is further configured to send the uplink data packet of the bearer which carries the information of the cell status when the processor starts the periodic timer of the bearer.

13. The device according to claim 8, wherein:
the processor is further configured to determine whether the report flag has been set when the processor starts the periodic timer of the bearer;
the sender is configured to send the uplink data packet of the bearer which carries the information of the cell status if the report flag has been set when the processor starts the periodic timer of the bearer; and
the processor is further configured to reset the report flag after the sender sends the uplink data packet of the bearer.

14. The device according to claim 8, wherein:
the processor is configured to determine the starting delay of the periodic timer of the bearer using at least one of the following algorithms: a random algorithm, a hash algorithm, and an equal-step algorithm.

* * * * *